United States Patent [19]

McMonigle

[11] 4,436,627

[45] Mar. 13, 1984

[54] MAGNETIC REMOVAL OF IMPURITIES FROM MOLTEN SALT BATHS

[75] Inventor: Matthew J. McMonigle, New Kensington, Pa.

[73] Assignee: Aluminum Company of America, Pittsburgh, Pa.

[21] Appl. No.: 376,588

[22] Filed: May 10, 1982

[51] Int. Cl.[3] .............................................. B01D 35/06

[52] U.S. Cl. ...................................... 210/695; 210/222

[58] Field of Search ....................... 210/222, 223, 695; 266/120

[56] References Cited

U.S. PATENT DOCUMENTS

| | | | |
|---|---|---|---|
| 3,399,134 | 8/1968 | Schouw et al. | 210/695 |
| 3,838,044 | 9/1974 | Hengeli | 210/695 |
| 4,116,829 | 9/1978 | Clark et al. | 210/695 |
| 4,206,000 | 6/1980 | Schuchardt et al. | 210/695 |
| 4,222,554 | 9/1980 | Bassett | 266/120 |
| 4,235,424 | 11/1980 | Bassett | 266/120 |
| 4,238,326 | 12/1980 | Wolf | 210/695 |
| 4,261,826 | 4/1981 | Dorgathen | 210/222 |

*Primary Examiner*—Charles N. Hart
*Assistant Examiner*—Wanda L. Millard
*Attorney, Agent, or Firm*—Andrew Alexander

[57] ABSTRACT

Magnetically attractive impurities such as oxides of iron are removed from a molten salt bath using a magnetic force in the form of either a permanent magnet or an electromagnet encased in a magnetically transparent refractory capable of withstanding both the heat and chemical corrosiveness of a molten salt bath in which the impurities such as iron oxides are present.

2 Claims, 4 Drawing Figures

MAGNETIC REMOVAL OF IMPURITIES FROM MOLTEN SALT BATHS

BACKGROUND OF THE INVENTION

This invention relates to the removal of impurities such as iron oxides from molten salt baths, and more particularly, to their removal by magnetic means.

Certain metals, notably aluminum, magnesium and lead, are recovered from their oxides or halide salts by electrolytic reduction of the oxide or salt in a molten salt bath in which the metal oxide or metal salt is dissolved.

Unfortunately, however, certain other metal salts are usually present in the feed due to their occurrence together in nature and process economics involved in complete prior separation and purification.

Some impurities, such as silicon impurities in aluminum oxides or salts, are electrolytically reduced with the principal metal and may be later separated when high purity demands require such separation.

Other impurities, such as iron oxides present with salts of lead do not dissolve in the molten salt bath used for the electrolytic reduction of lead from lead chloride. While this may be desirable from the standpoint of purity of the reduced metal, it also results in an unacceptable buildup of iron oxide in the bath. If sufficient particulate is entrained in the liquid streams, it may cause attrition of graphite and refractory surfaces resulting in lowering of current efficiency, increased electrical current consumption per pound of metal reduced, shorting between electrodes and ultimately shutdown of the cell.

Furthermore, the presence of high concentrations of iron oxides increases the chance of chemical reaction between the iron oxide, carbon and chlorine in the cell to form iron chloride and carbon dioxide resulting in depletion of the carbon electrodes.

It would, therefore, be desirable to be able to periodically remove such buildups of iron oxide from a molten salt bath without necessitating shutdown and draining of the bath from the cell.

SUMMARY OF THE INVENTION

It is, therefore, an object of the invention to remove impurities from a molten salt bath.

It is another object of the invention to affect such a removal using magnetic means.

These and other objects of the invention will be apparent from the drawings and accompanying description.

In accordance with the invention, impurities such as iron oxide are removed from a molten salt bath by magnetic means removably placed in the bath to attract the iron oxide to adhere to such magnetic means. Removal of the magnetic means from the bath with the iron oxide particles clinging thereto results in a lowering of the iron oxide content in the bath.

DETAILED DESCRIPTION OF THE INVENTION

The invention comprises the removal of impurities from a molten salt bath using magnetic means to attract the impurities. The magnetic means comprises a member which can be introduced into a molten salt bath to attract the particles to be removed. The impurities cling to the magnetic means and are thereby removed from the bath by withdrawal of the magnetic means from the molten salt bath.

Figure 1:
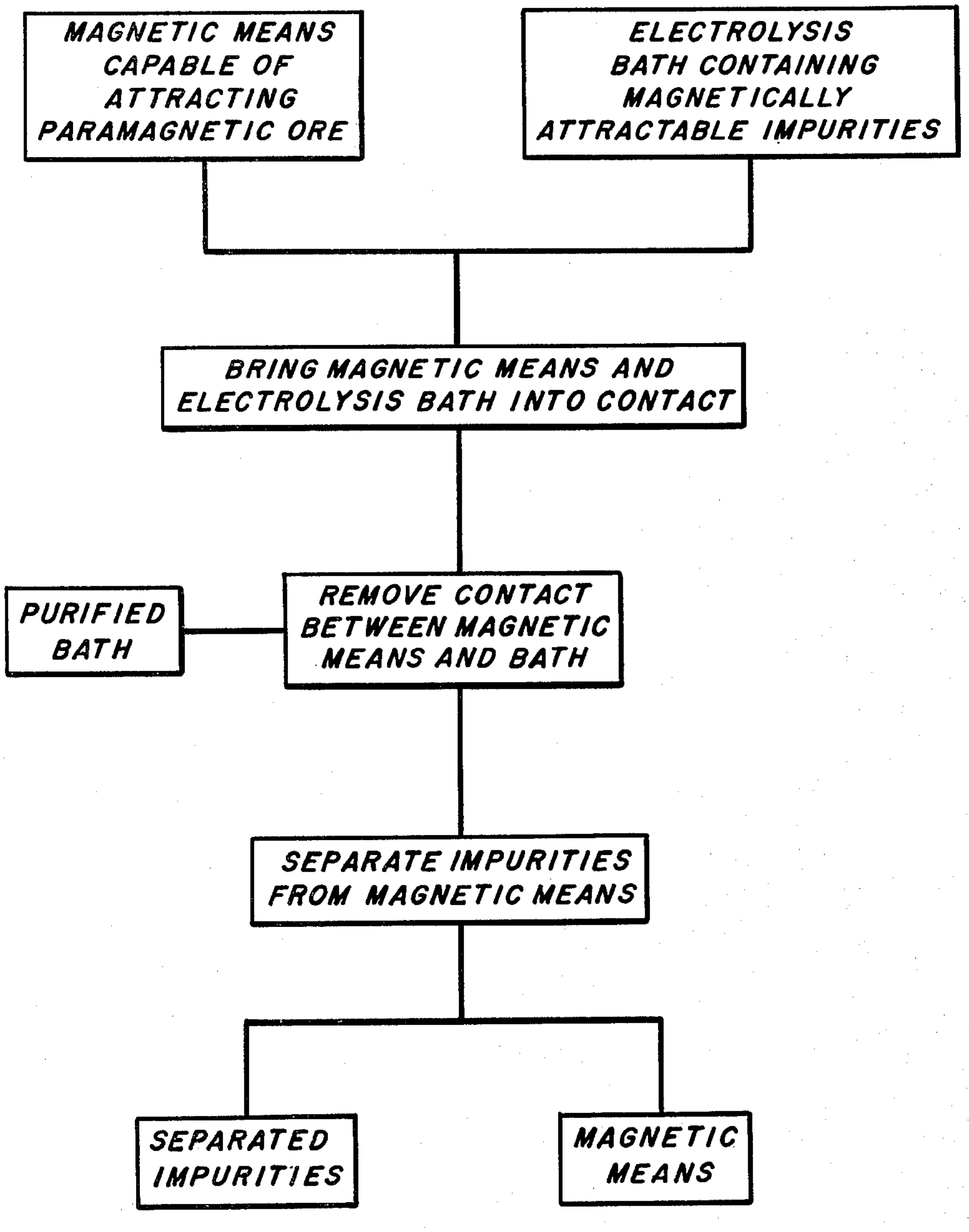
FIG. 1 is a flow sheet depicting the process of the invention.
Figure 2:
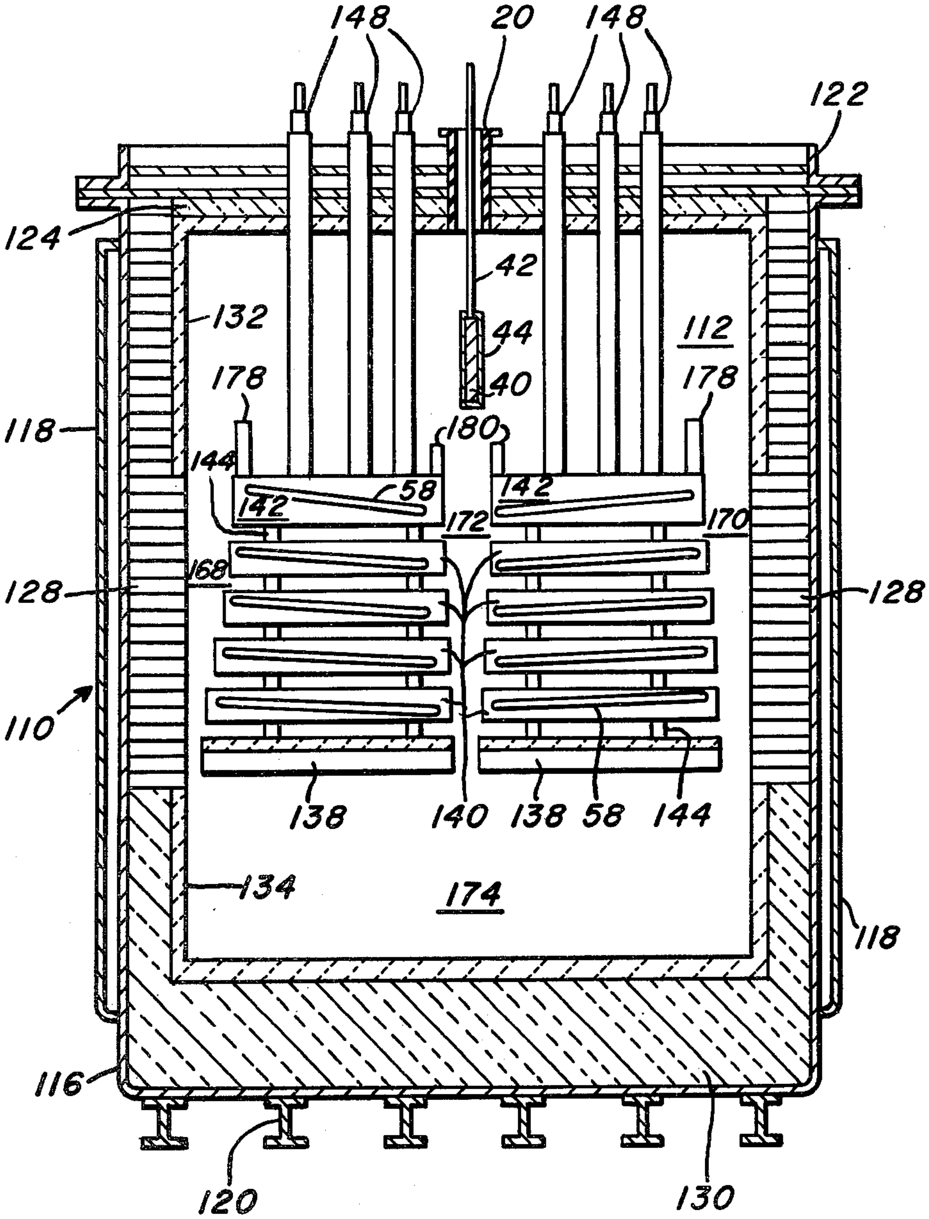
FIG. 2 is a side-elevational view in cross section of an electrolytic cell having magnetic means for removal of iron oxide impurities.

Turning to FIG. 2, a typical electrolytic cell for the reduction of a metal halide such as lead chloride is generally shown at 110. Cell 110 comprises an outer shell 116. Structural support for outer shell 116 is provided by reinforcing members 118 and I-beams 120, also preferably of steel construction. Cell 110 is lined with a refractory lining 130 in the lower portion of the cell. This refractory lining is selected to have a low thermal conductivity as well as resistance to attack by molten metal. The upper portion of the cell is lined with refractory material 128 which normally will not come in contact with the molten metal which falls to the bottom of the cell as it is produced.

Located adjacent to and inside of linings 128 and 130 are carbonaceous lining elements 132, 134 and 136. These carbonaceous elements are especially resistant to attack by molten metal or chlorine gas. Carbonaceous elements 132, 134 and 136, which are preferably constructed of graphite, are fitted into machined recesses in refractory linings 128 and 130.

Within cell 110 are a plurality of electrodes which are disposed horizontally and, in the embodiment illustrated, are arranged in two vertical stacks. Each stack includes a cathode 138, intermediate bipolar electrodes 140 and anode 142. Cathode 138 has an upper lip which is fitted into machined recesses in refractory brick lining 128. The remaining electrodes are stacked each above the one below with their sides abutting lining 128 in a spaced relationship established by interposed refractory spacers 144. These spacers are sized to closely space the electrodes so as to define interelectrode spaces between each pair of adjacent electrodes. Preferably, the electrodes are spaced with their adjacent surfaces separated by $\frac{3}{4}$ inch or less.

Anode 142 of each stack is connected to at least one anode terminal 148 which serves as a positive lead. Similarly, each cathode 138 is connected to at least one cathode terminal (not shown) which serves as a negative current lead.

Anode terminals 148 extend through and are suitably insulated from the electrically conductive portions of electrolysis lid assembly 122. Lid assembly 122 is also provided with a central port 20 which permits entrance and egress with the interior of cell 110 for a purpose which will be described below. The cathode terminals extend through and are suitably insulated from the electrically conductive portions of brick lining 128, outer shell 116 and reinforcing member 118. When an appropriate voltage is imposed between the anode and the cathode in a stack, a bipolar character is imparted to the intermediate electrodes 140.

Cell 110 may be operated at a suitable temperature to produce metal by elecrolytic reduction of a halide of the metal in a molten bath comprising the metal halide dissolved in at least one molten halide of higher electrodecomposition potential than the metal halide. When this cell is operated to produce lead, therefore, the preferred operating temperature is within the range of 400° to 450° C. and the preferred bath composition is comprised of lead chloride dissolved in at least one molten halide of higher electrodecomposition potential than lead chloride. These molten halides are preferably alkali metal chlorides, although other alkali metal halides and alkaline earth metal halides may be used. Good results are obtained when the bath composition comprises a mixture of lead chloride, potassium chloride and lithium chloride. In a bath of this composition, it is desirable that the weight ratio of potassium chloride to lithium chloride be within the range of 1:2.0 to 2.0:1. A bath composition can comprise a mixture of 10 to 80 wt.% lead chloride, and preferably 20 to 70 wt.% lead chloride, 15 to 55 wt.% potassium chloride and 10 to 40 wt.% lithium chloride. An especially preferred composition contains about 40 wt.% lead chloride, 35 wt.% potassium chloride and 25 wt.% lithium chloride.

When cell 110 is operated in the preferred manner to produce lead, electrolysis takes place in each interelectrode space in a stack to produce chlorine on the lower (anode) face of the electrode at the top of the interelectrode space and lead on the upper (cathode) face of the electrode at the bottom of the interelectrode space.

As shown in FIG. 2, cell 100 includes a vertical gas-lift passage associated with each stack of electrodes. The gas-lift passage is in fluid communication with each interelectrode space in the stack. As shown in FIG. 2, cell 110 includes two gas-lift passages. Gas-lift passage 168 is associated with the left stack of electrodes and gas-lift passage 170 is associated with the right stack of electrodes.

As further shown in FIG. 2, cell 110 also includes a vertical bath-supply passage associated with each stack of electrodes. The bath-supply passage is also in fluid communication with each interelectrode space in the stack and is preferably located at the opposite side of the stack from the gas-lift passage. Adjacent stacks of electrodes may share the same bath-supply passage. Thus, as shown in FIG. 2, both stacks of electrodes are associated with common bath-supply passage 172.

In operation then, reduced metal such as lead forms on the lower (anode) face of each electrode and then flows down passage 172 to reservoir 174. At the same time, the halogen gas such as chlorine flows upward via gas-lift passages 168 and 170. Thus, a circular flow of bath is induced by the falling metal and the rising gas which uniformly circulates the bath throughout the cell. Thus, insertion of the magnetic means at any convenient point to attract and collect the impurities, as will be described below, causes the magnetic means to contact the circulating bath which contains the impurities as suspended solids.

Figure 3A:
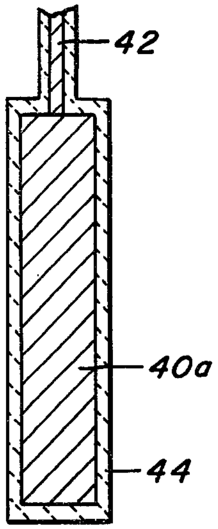
FIG. 3A is a side-elevational view in cross section of one embodiment of the magnetic means.
Figure 3B:
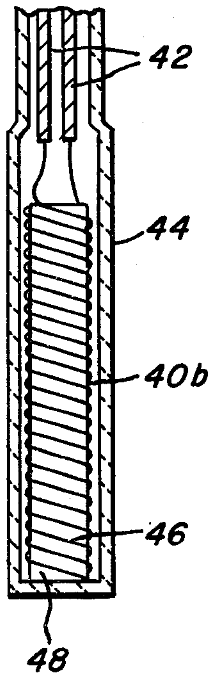
FIG. 3B is a side-elevational view in cross section of another embodiment of the magnetic means.

In accordance with the invention, magnetic means 40 may be lowered into the molten salt bath 112 in cell 110 to attract ferromagnetic or paramagnetic solids present in bath 112 as solid impurities. One or more rods 42 which may be constructed of steel are fastened to magnetic means 40 to facilitate introduction and removal of the magnetic means with the molten salt bath. If magnetic means 40 comprise one or more permanent magnets 40*a*, as shown in FIG. 3A, only one steel rod need be used. However, if an electromagnet 40*b*, as shown in FIG. 3B, is used, two rods are used to provide both physical support for and electrical contact with the magnetic means. In the embodiment shown in FIG. 3B, a coil of wire 46 is wrapped around an iron core 48 and each end of coil 46 is then attached to one of the rods 42.

In accordance with a preferred embodiment, as in FIGS. 3A and 3B, magnetic means 40 are encapsulated in a casing 44 of material capable of withstanding the heat and chemical corrosiveness of the molten salt bath without shielding the magnetic flux of the magnetic means. Materials such as quartz, fused alumina or mullite or other magnetically transparent materials which have a melting point above that of the bath are satisfactory.

While the process of the invention may be employed whenever magnetically attractive solid impurities (herein referred to as ferromagnetic or paramagnetic materials) are present in a molten salt bath, the invention finds particular utility when used in connection with a molten salt bath used in the electrolytic production of lead. The lead chlorine feed material usually contains iron oxide as an insoluble contaminate entrained therewith. The oxide concentration gradually builds up in the bath due to its insolubility and the continual replenishment of lead chloride feed as the salt is electrolytically reduced. Since the iron oxide is magnetically attractable, the process can be used to great advantage by periodic introduction of the magnetic means into the bath to lower the iron oxide concentration therein.

While the shape of the encased magnetic means is not crucial to the magnetic process, preferably when permanent magnet means are used, the shape is preselected to facilitate removal of the clinging iron oxide particles from the magnet means. For example, if an elongated rod-like shape of constant cross section is used, such as a polygonal or circular cross section, the magnetic means may be passed through a female die of similar cross section to strip the clinging particles from the magnetic means.

If electromagnetic means such as a coil encased in quartz or other suitable protective material is employed, the shape may be altered to maximize the total surface area in contact with the bath to thereby maximize the amount of particle attraction during each pass. Naturally, of course, in either embodiment, the shape must be within the dimensional limitations imposed by the size of port 20.

When the electromagnetic means are withdrawn from the bath, the encased electromagnet is de-energized causing the attracted particles to fall away by gravity from the electromagnetic means.

While the invention has been described in terms of preferred embodiments, the claims appended hereto are intended to encompass other embodiments which fall within the spirit of the invention.

What is claimed is:

1. A process for removing ferromagnetic impurities from a molten salt bath used for electrolytic reduction of metal salt which comprises:

(a) encasing in a magnetically transparent quartz material, electromagnetic means capable of attracting said ferromagnetic impurities;

(b) contacting said molten salt bath with said encased electromagnetic means to cause said impurites to be attracted to said electromagnetic means; and (c) withdrawing from contact with said molten salt bath said encased electromagnetic means having said impurities clinging thereto by magnetic attraction.

2. The process of claim 1 wherein said ferromagnetic impurities are removed from said encased electromagnetic means by de-energizing said electromagnetic means.

* * * * *